May 5, 1925.
C. E. GLESSNER
1,536,291
METHOD OF DEHYDRATING
Filed July 21, 1923
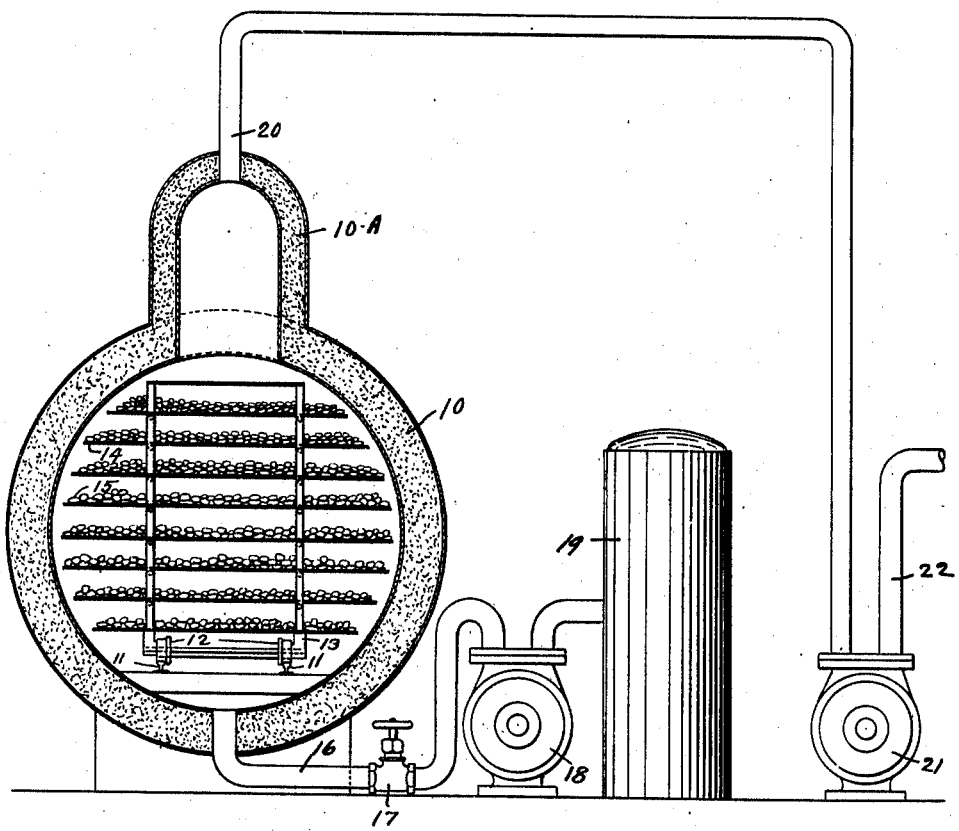
INVENTOR
Chas. E. Glessner,
By E.B.Birkenbeul
ATTORNEY.

Patented May 5, 1925.

1,536,291

UNITED STATES PATENT OFFICE.

CHARLES E. GLESSNER, OF PORTLAND, OREGON.

METHOD OF DEHYDRATING.

Application filed July 21, 1923. Serial No. 652,918.

*To all whom it may concern:*

Be it hereby known that I, CHARLES E. GLESSNER, a citizen of the United States, and a resident of Portland, in the county of Multnomah and State of Oregon, have invented a new and useful Method of Dehydrating, of which the following is a specification.

This invention relates more particularly to the removal of moisture from food stuffs and other articles.

An object of my invention is the dehydration of materials without oxidation or the destruction of vitamines, if present.

A second object is dehydration at low temperatures to prevent caramelizing or other undesirable effects.

A third object is the conduction of heat across low pressure areas and across articles which have become poor heat conductors through the action of the drying process itself.

A fourth object is the preservation of the original flavor and color of food.

A fifth object is the economy of carbon dioxide gas required.

I accomplish these results in the manner set forth in the following specification and shown in the drawing in which I have illustrated somewhat diagrammatically, means by which my method can be put into operation.

Referring in detail to the drawing, I have illustrated my method in connection with a special form of container 10, more fully described in my United States Patents Numbers 1,421,685, 1,458,403 and 1,421,454. Within the container 10 are provided the tracks 11 on which ride the wheels 12 of the carriage 13. The carriage 13 is preferably built of pipe to which steam may be admitted, as indicated in Patent No. 1,421,454.

On the shelves 14 of the carriage 13 may be placed articles 15 to be dried. Opening into the bottom of the container 10 is a pipe 16 which includes a valve 17 and connects with a gas pump 18 through which carbon dioxide gas may pass to or from the gas tank 19.

Opening into the dome 10ª of the container 10 is a moisture exhausting pipe 20 which connects with the moisture extracting pump 21 whose exhaust pipe 22 carries the moisture away in the most convenient manner.

The operation of my method is as follows: Food 15 is placed on the shelves 14 and the container 10 is sealed, as fully described in the aforementioned patents. Carbon dioxide gas which is under pressure in the tank 19 is permitted to flow into the container 10 by opening the valve 17. The air within the container 10 is forced out of the pipe 20 or exhausted by the pump 21 until the container 10 is partly full of gas. The valve 17 is now closed and heat admitted to the tank 13 and the pump 21 operated.

It will be understood that the heat above suggested may be applied as illustrated in the above last mentioned patent, or by electric heating elements, or any other convenient device without departing from the spirit of my invention, the object being merely to introduce heat into the container which heat is conducted by the gas itself to the food being dried.

The gas within the container, which is a non-oxidizing agent, now becomes rarefied and in its rarefied state must be present in sufficient quantity to cover the food, and the moisture content of the food rapidly evaporates and rises to the top of the relatively heavy gas from which it is carried away by the pump 21.

When the dehydration of the food is completed, the pump 21 is stopped and the gas in the container 10 is returned by the pump 18 to the tank 19. The container 10 may now be opened and the dried food removed and a fresh supply placed on the shelves 14 and the operation repeated as often as desired.

It will be understood that if an undesirable waste of gas occurs at the discharge end of the pipe 22, the usual gas separator may be employed without departing from the spirit of my invention.

In the dehydrating art it is well recognized that two great difficulties are encountered. If air is used as a drying medium at the usual atmospheric pressure, then the sugar content of the food is carameled since a much higher temperature is necessary, and also the food oxidizes badly and the vitamines are destroyed by the oxidation. If the vacuum process is employed then it may be found difficult to convey heat to the articles being dried. Since the carbon dioxide gas is a heat conductor and a non-oxidizing agent, it is evident that reduced pressures, and therefore reduced temperatures, may be employed and the food thoroughly dried without oxidation or carameling by employing carbon dioxide gas as a heat conveying medium.

Since food which is dried is itself a poor conductor of heat then it is evident that to fill its pores with a heat-conducting gas will permit the food to be thoroughly dried throughout.

What I claim as new is:

In the art of dehydration, a method of supplying heat to food in a partial vacuum consisting of placing same in a partial vacuum, then surrounding the food with carbon dioxide gas also maintained at a reduced pressure and then exposing said rarefied gas to the action of heat in a manner that said heat may be carried by said gas, to all of the surface of said food to evaporate its moisture.

CHAS. E. GLESSNER.